US005876025A

United States Patent [19]

Yonezawa

[11] Patent Number: 5,876,025

[45] Date of Patent: Mar. 2, 1999

[54] CYLINDER APPARATUS

[75] Inventor: Keitaro Yonezawa, Kobe, Japan

[73] Assignee: Kabushiki Kaisha Kosmek, Hyogo, Japan

[21] Appl. No.: 840,810

[22] Filed: Apr. 16, 1997

[30] Foreign Application Priority Data

Apr. 16, 1996 [JP] Japan .................................... 8-093786

[51] Int. Cl.[6] ........................................ B23Q 3/08

[52] U.S. Cl. ................................. 269/24; 269/25; 269/32

[58] Field of Search ................................ 269/24, 25, 32, 269/31, 27, 20; 254/93 H, 93 R; 417/252, 401

[56] References Cited

U.S. PATENT DOCUMENTS

| | | | |
|---|---|---|---|
| 2,863,285 | 12/1958 | Pomeroy | 254/93 H |
| 3,700,227 | 10/1972 | Sessody | 269/24 |
| 4,508,327 | 4/1985 | Ersoy | 269/32 |
| 4,812,109 | 3/1989 | Yonezawa | 417/401 |
| 4,830,249 | 5/1989 | Mirenda et al. . | |
| 4,850,828 | 7/1989 | Yonezawa | 417/252 |
| 4,909,493 | 3/1990 | Yonezawa | 269/32 |
| 5,108,079 | 4/1992 | Yonezawa et al. | 269/24 |
| 5,113,899 | 5/1992 | Yonezawa . | |

FOREIGN PATENT DOCUMENTS

| | | |
|---|---|---|
| 0 161 084 | 11/1985 | European Pat. Off. . |
| 1054363 | 1/1967 | United Kingdom . |

*Primary Examiner*—David A. Scherbel
*Assistant Examiner*—Lee Wilson
*Attorney, Agent, or Firm*—Bacon & Thomas, PLLC

[57] ABSTRACT

A spring chamber (17) is formed above a piston (11) inserted into a housing (7), and the spring chamber (17) is communicated with an outside of the housing (7) through a breathing passage (41). A pressurized fluid is supplied to and discharged from an actuation chamber (18) formed below the piston (11). A clamping member (4) connected to the piston (11) is urged to a clamping position (X) by a clamping spring (21) within the spring chamber (17). A check valve seat (45) and a check valve chamber (46) are arranged orderly in the breathing passage (41). A checking member (47) within the check valve chamber (46) is pushed to the check valve seat (45) by a checking spring (48) for valve closing.

5 Claims, 6 Drawing Sheets

CYLINDER APPARATUS

BACKGROUND OF THE INVENTION

1. Field of the Invention

The present invention relates to a cylinder apparatus adapted to move a piston by a fluid pressure, and more specifically to an apparatus of the type having one end side of the piston communicated with an outside through a breathing passage.

2. Description of Prior Art

Generally, a cylinder apparatus has a piston inserted into a cylinder bore of a housing, a first chamber defined on one end side of the piston communicated with an outside of the housing through a breathing passage, and a second chamber defined on the other end side of the piston, which a pressurized fluid is supplied to and discharged from.

When the pressurized fluid is supplied to the second chamber, since the piston contracts the first chamber to increase an inside pressure of the first chamber, an air within the first chamber is flowed to an outside of the housing through the breathing passage. To the contrary, when the pressurized fluid is discharged from the second chamber, since the piston expands the first chamber by an urging force of a spring, the inside pressure of the first chamber lowers below an atmospheric pressure so that the atmosphere outside the housing flows into the first chamber through the breathing passage.

Conventionally, a filter made of wire-netting or a filter made from sintered metal is mounted to a midway portion of the breathing passage. Thereby, when the atmosphere outside the housing passes through the breathing passage, dusts within the atmosphere and foreign materials such as chips are caught by the filter so that those foreign materials can be hindered from entering the housing.

By the way, though the filter can catch solid foreign materials such as the dusts and the chips, it can't catch a liquid and a gas. Therefore, when the cylinder apparatus is used in the atmosphere charged with a corrosive liquid and/or gas, the following problems are caused.

For example, when the cylinder apparatus is used as a work clamping means of a numerically controlled lathe which uses water-miscible cutting oil, a large amount of water-miscible cutting oil is scattered around the cylinder apparatus and a large amount of misty water droplets are contained also in the atmosphere.

When the atmosphere outside the housing flows into the housing through the breathing passage, the water-miscible cutting oil and the misty water droplets easily pass through the filter and enter the housing. Since the entered water-miscible cutting oil and water droplets deteriorate and change in quality within the housing to corrode a slide surface of the cylinder bore and a slide surface of the piston, the piston becomes unable to slide smoothly. As a result, the cylinder apparatus becomes unable to be used in a short period of time.

SUMMARY OF THE INVENTION

An object of this invention is to enable a cylinder apparatus to be used in a good condition for a long period of time even in such an atmosphere as to contain a corrosive liquid and/or gas.

For accomplishing the above-mentioned object, the invention of claim 1 is constructed as follows.

That is, a piston is inserted into a cylinder bore of a housing, and a first chamber defined on a first end side of the piston is communicated with an outside of the housing through a breathing passage. A pressurized fluid is supplied to and discharged from a second chamber defined on a second end side of the piston, and the piston is urged toward the second end side by a spring. A check valve seat is arranged in the breathing passage and a checking member is resiliently pushed to the check valve seat from an outside of the housing.

Incidentally, provided as a means for making the checking member resiliently contact with the check valve seat are such a means as to urge the checking member by an elastic member such as a spring and rubber and such a means as to make use of a resilient force of the checking member itself formed of an elastic member.

The invention of claim 1 functions as follows.

When the pressurized fluid is supplied to the second chamber, since the piston contracts the first chamber to increase the inside pressure thereof, a fluid such as an air within the first chamber pushes and opens the checking member and flows out to the outside of the housing. To the contrary, when the pressurized fluid is discharged from the second chamber, since the first chamber is expanded by an urging force of the spring, the inside pressure of the first chamber lowers. Thereupon, since the checking member is held in a closing contact with the check valve seat by a resultant force of a differential pressure between the inside and outside pressures of the housing and the valve closing force (for example, the urging force of the spring), it is possible to obstruct the atmosphere outside the housing from entering the first chamber.

Thereby, even when a large amount of water-miscible cutting oil is scattered around the housing and/or a large amount of misty water droplets are contained in an atmosphere, theses water-miscible cutting oil and misty water droplets don't enter the first chamber. Similarly, even when the corrosive gas exists in the atmosphere, it is possible to obstruct the entering of the corrosive gas into the first chamber by the checking member.

Therefore, according to the invention of claim 1, it is possible to maintain the slide surface of the cylinder bore and the slide surface of piston in a good condition for a long period of time, so that the cylinder apparatus can be used without any maintenance service for a long period of time.

Further, the invention of claim 1 presents the following advantages owing to the above-mentioned operation of the checking member.

When the cylinder apparatus is used for a long period of time, abrasion and/or swelling of a sealing member of the piston are caused, so that the pressurized fluid supplied to the second chamber leaks into the first chamber. But, since the leaked pressurized fluid pushes and opens the checking member so as to be discharged to the outside of the housing when the first chamber is contracted, it is not stored within the first chamber. Thereby, abnormal increasing of the pressure within the first chamber is prevented, so that the cylinder apparatus can be operated in a good condition for a long period of time.

By the way, in a case that the pressurized fluid to be supplied to the second chamber is a liquid such as a pressurized oil, further the following advantages can be obtained. That is, since the liquid leaked from the second chamber to the first chamber can be discharged automatically through the checking member, it is possible to prevent the filling-up of the first chamber with the liquid. As a result, it is possible to prevent the cylinder apparatus from being locked by the leaked liquid.

When the invention is constructed as described in claim 2 or 3, further the following advantages can be obtained.

Since the entering of the corrosive liquid and/or gas existing outside the housing into the first chamber can be obstructed by the checking member, the spring installed within the first chamber can be prevented from being corroded. Therefore, the piston can be driven strongly and reliably by the spring for a long period of time.

Incidentally, when a lubricating oil is applied to a wall surface of the first chamber and the spring at the time of assembly of the cylinder apparatus, as described above, since the entering of the liquid existing outside the housing into the first chamber can be obstructed, it is possible to prevent the applied lubricating oil from being deteriorated by the corrosive liquid and to prevent the lubricating oil from being brought out by the corrosive liquid. Accordingly, it is possible to smoothly operate the cylinder apparatus owing to the lubricating oil and realize the long term operation without any maintenance service.

BRIEF DESCRIPTION OF THE DRAWINGS

FIG. 1 is a vertical sectional view of a clamping condition of a clamp apparatus employing a cylinder apparatus;

FIG. 2 shows an unclamping condition of the clamp apparatus and is a view corresponding to FIG. 1;

FIG. 3 shows a retreated condition of the clamp apparatus and is a view corresponding to FIG. 1;

FIG. 4 is a plan view of the clamp apparatus in FIG. 1;

FIG. 5 is a detailed view of a portion indicated by an arrow V in FIG. 1.

DESCRIPTION OF THE PREFERRED EMBODIMENTS

A first embodiment of the present invention will be explained with reference to FIGS. 1 to 5. This first embodiment shows a spring-type clamp apparatus employing a cylinder apparatus according to the present invention.

Figure 4:
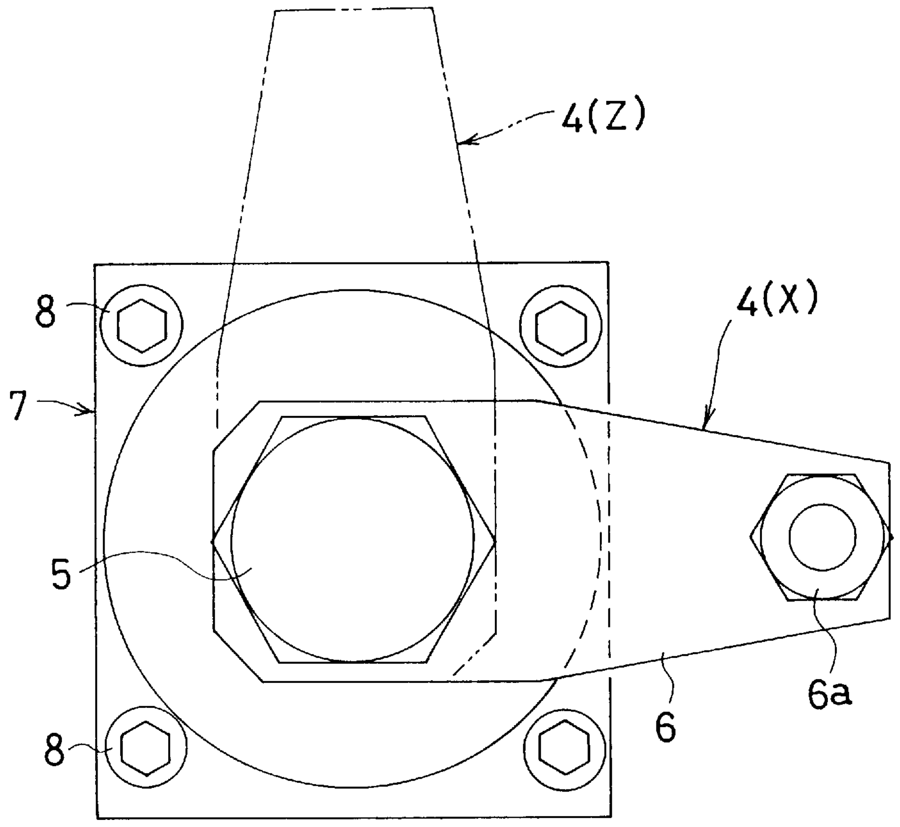
Figure 5:
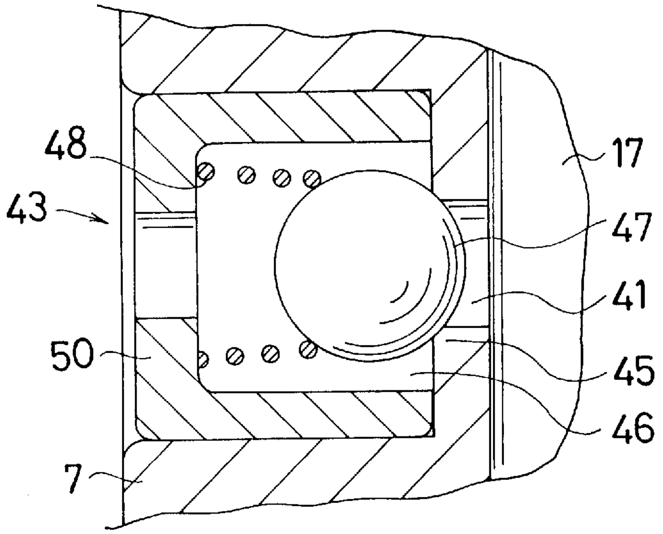

First, a construction of the clamp apparatus will be explained with reference to FIG. 1, FIG. 4 and FIG. 5.

A workpiece 2 placed on an upper surface of a table 1 is fixedly secured by a clamping member 4 of the clamp apparatus 3. The clamping member 4 comprises a rod 5 extending vertically, and an arm 6 fixedly secured to an upper portion of the rod 5. A push bolt 6*a* is secured to a leading end portion of the arm 6 so that its height can be adjusted. Incidentally, a housing 7 of the clamp apparatus 3 is fixedly secured to the table 1 by four bolts 8.

A first cylinder bore 9 having a large diameter and a second bore (another cylinder bore) 10 having a small diameter are formed substantially coaxially in the housing 7 so as to be vertically spaced apart at a predetermined distance. An annular first piston 11 is inserted into the first cylinder bore 9 hermetically. A lower portion of the rod 5 is inserted into a cylindrical bore 11*a* of the first piston 11 rotatably and hermetically. Incidentally, a thrust bearing 15 is mounted between a transmission flange 14 of the rod 5 and a lower surface of the first piston 11. Numerals 24 and 25 designate O-rings (sealing members) respectively.

A clamping spring chamber (a first chamber) 17 is formed between an upper wall 7*a*, as shown, or a lower wall 7*b*, of the housing 7 and the first piston 11, and an actuation chamber (a second chamber) 18 is formed below the first piston 11. The first piston 11 is urged downward by a first spring (a clamping spring) 21 installed within the spring chamber 17, and a movement of the first piston 11 over a predetermined distance is restrained by a ring 19.

A swinging operation chamber 26 is formed in a lower portion of the housing 7 so as to be in series and communication with the actuation chamber 18, and a swinging operation means 27 is disposed within the swinging operation chamber 26. The swinging operation means 27 is constructed as follows.

The second cylinder bore 10 is formed in a central lower portion of the swinging operation chamber 26, a second piston 12 is inserted into the second cylinder bore 10 hermetically, and an engagement flange 29 projected upward from the second piston 12 is fitted into the swinging operation chamber 26. A total area of an annular pressure receiving area of the first piston 11 and a pressure receiving area of the rod 5 is set larger than a pressure receiving area of the second piston 12.

The actuation chamber 18 formed between the engagement flange 29 and the first piston 11 is communicated with a pressure oil supply/discharge port 40 through a throttling hole 38 and the swinging operation chamber 26. When the engagement flange 29 is urged upward by a second spring 22, the second piston 12 is urged toward the rod 5.

A ball 30 disposed at an outer peripheral portion of the engagement flange 29 is adapted to be fitted into a groove 31 of the housing 7. A swing prevention mechanism 32 for the second piston 12 is constructed by these ball 30 and groove 31.

Further, a converting mechanism 33 is disposed for converting a vertical linear movement of the second piston 12 into the swinging movement of the rod 5. The converting mechanism 33 comprises a shaft 34 projected upward from the second piston 12, a pair of guide grooves 35, 35 formed in the shaft 34 and other balls 36 fitted into the respective grooves 35 and supported by the rod 5. The shaft 34 is inserted into the lower portion of the rod 5. The guide groove 35 is provided with a linear portion 35*a* and a spiral portion 35*b* (refer to FIG. 2).

The clamping spring chamber 17 is communicated with an outside of the housing 7 through a first breathing passage 41, and a lower space of the second cylinder bore 10 is communicated with the outside of the housing 7 through a second breathing passage 42.

A check valve 43 is mounted to the first breathing passage 41. As shown mainly in FIG. 5, the check valve 43 comprises a check valve seat 45 and a check valve chamber 46 arranged in series, a ball-shaped checking member 47 inserted into the check valve chamber 46 and a checking spring 48 for pushing the checking member 47 to the check valve seat 45 for the valve closing.

The check valve chamber 46 is constructed by an inner space of a sleeve 50 forcibly and fixedly fitted into the housing 7. The sleeve 50 may be fixedly secured by a screw instead of being forcibly fitted. By the way, the sleeve 50 may be omitted and the check valve chamber 46 may be directly formed in the housing 7.

Used as a material of the ball-shaped checking member 47 are steel, rubber, plastic and so on. The checking member 47 may have a disc-like or conical shape instead of the ball-shape.

Further, the check valve 43 may be a check valve of the read type. In this case, the checking member is brought into closing contact with the check valve seat by its own elasticity. The check valve seat may be formed on an outer peripheral surface of the housing 7.

Incidentally, the above-mentioned various kinds of check valves may be disposed in the second breathing passage 42.

Figure 2:
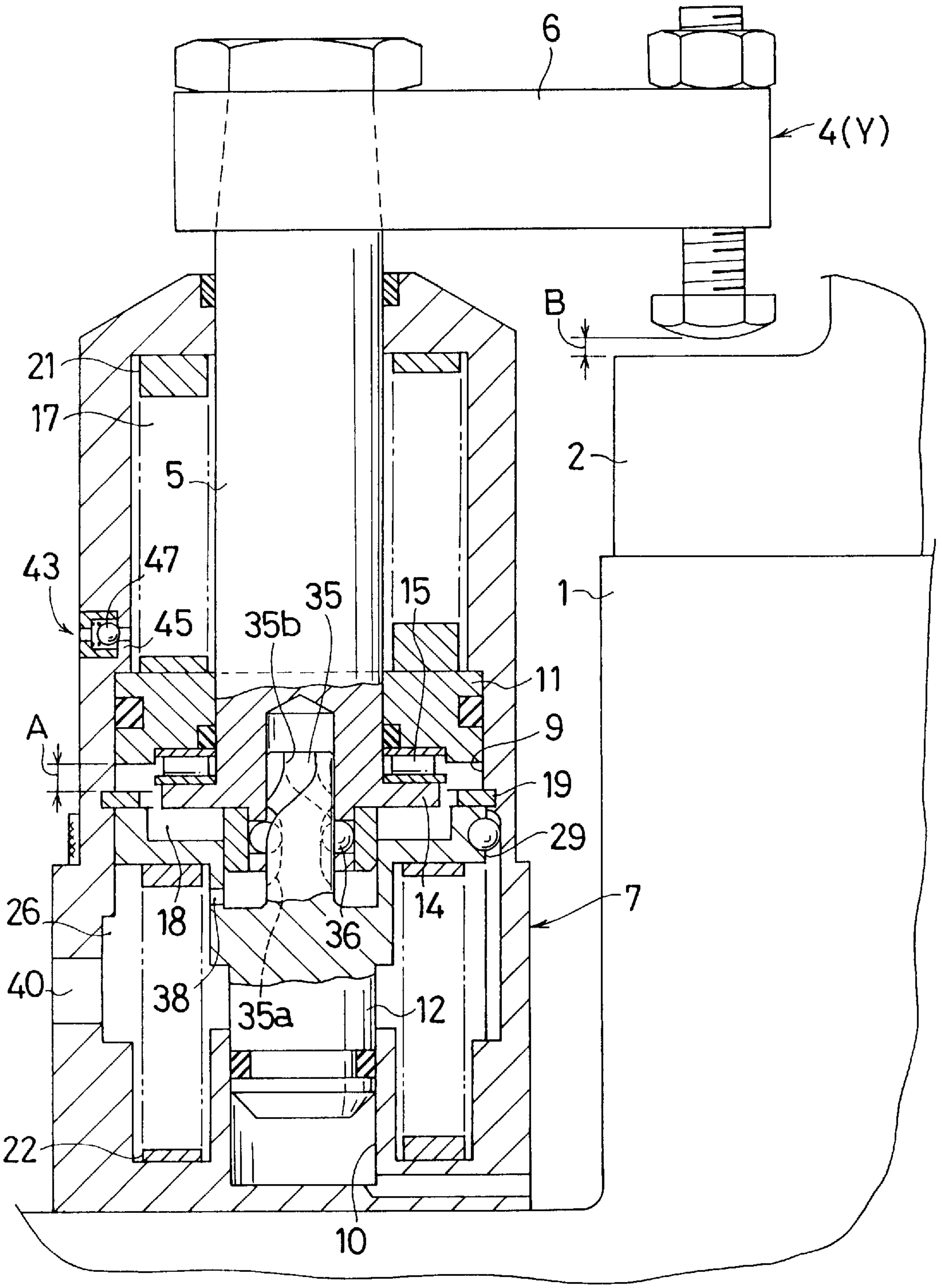
Figure 3:
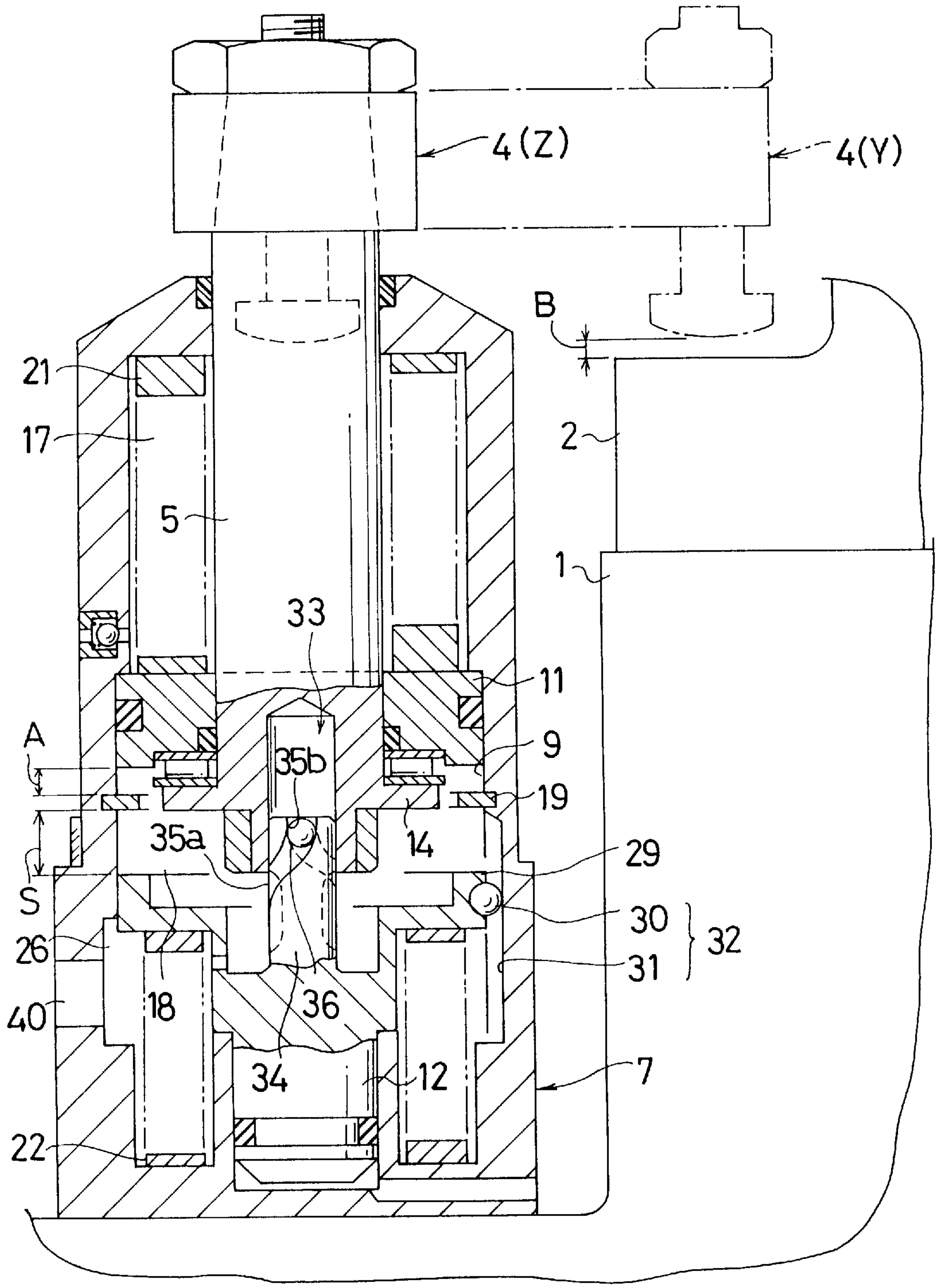

Next an operation of the above-mentioned clamp apparatus will be explained with reference to FIG. 1, FIG. 2 and FIG. 3. FIG. 2 shows an unclamping condition, and FIG. 3 shows a retreated condition. Incidentally, in FIGS. 1 to 3, the symbol A designates a total stroke, the symbol B does a clamp stroke, the symbol C does an extra stroke and the symbol S does a swing stroke.

Figure 1:
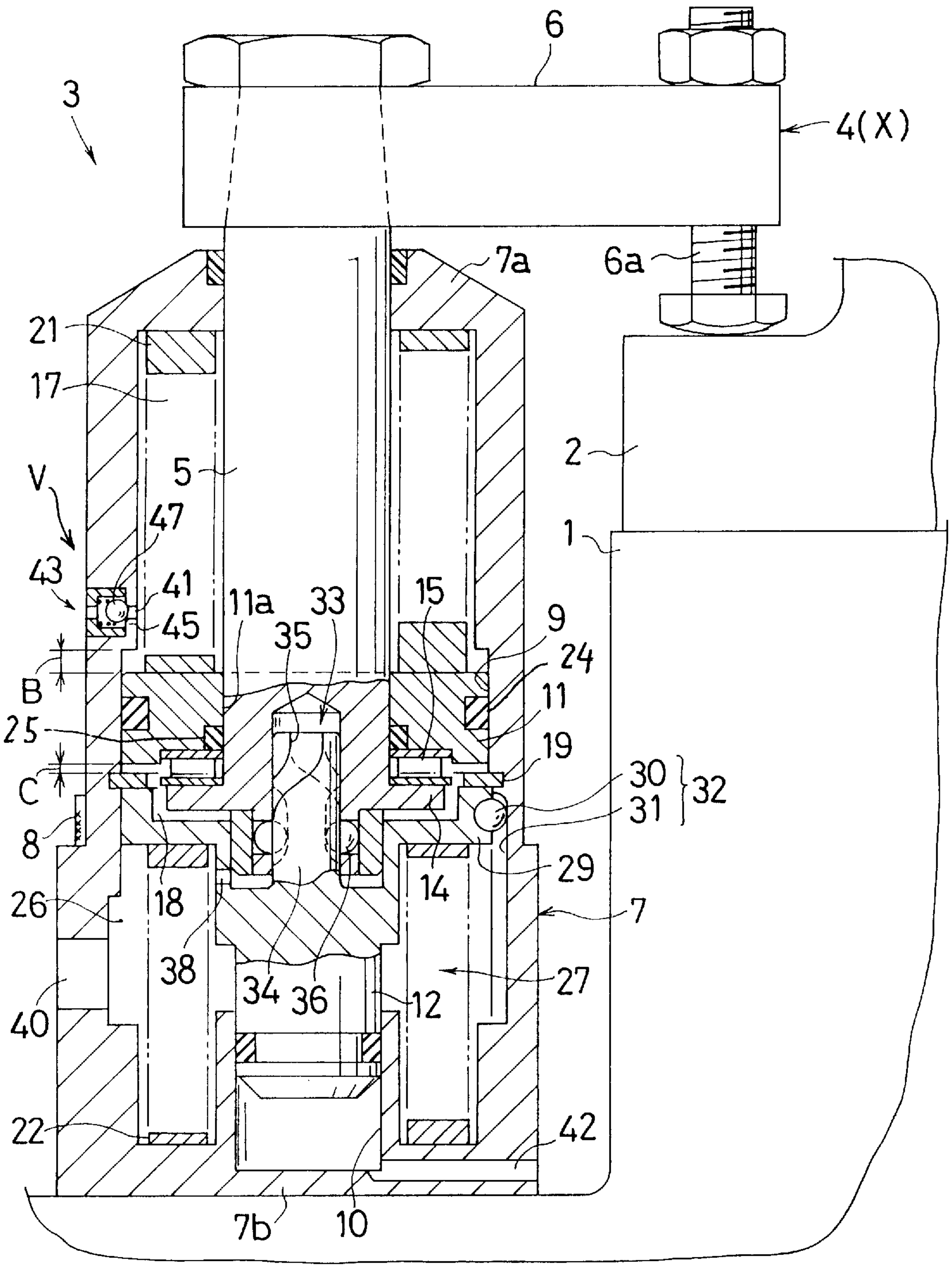
FIG. 1 to FIG. 5 show a first embodiment of the present invention.

In the clamping condition of FIG. 1, the pressurized oil within the actuation chamber 18 has been discharged to the outside through the throttling hole 38, the swinging operation chamber 26 and the supply/discharge port 40. Thereby, the first spring 21 resiliently urges the first piston 11 downward and the first piston 11 pushes the rod 5 downward through the thrust bearing 15 and the transmission flange 14. As a result, the clamping member 4 is changed over to a clamping position X, so that the arm 6 fixedly secured to the upper portion of the rod 5 pushes the workpiece 2 onto the table 1 through the push bolt 6*a*.

When changing over from the clamping condition of FIG. 1 to the retreated condition of FIG. 3 through the unclamping condition of FIG. 2, first the pressurized oil having a middle pressure (a pressure of about 14 $kgf/cm^2$ to 28 $kgf/cm^2$ in this embodiment) is supplied to the supply/discharge port 40 in the clamping condition of FIG. 1. Incidentally, 1 $kgf/cm^2$ is equal to about 0.10 MPa (mega pascal).

Thereupon, as shown in the unclamping condition of FIG. 2, the pressurized oil is supplied to the actuation chamber 18 from the supply/discharge port 40 through the throttling hole 38, so that the pressurized oil acts on the rod 5 and the first piston 11. Thereupon, an oil pressure acting on the pressure receiving area of the rod 5 pushes up the first piston 11 through the transmission flange 14 and the thrust bearing 15 in order, and an oil pressure acting on the annular area of the first piston 11 pushes up the first piston 11. Thereby, the rod 5 is raised up against the first spring 21 following the engagement between the linear portion 35*a* of the guide groove 35 and the ball 36, so that the clamping member 4 can be changed over to the unclamping position Y.

By the way, when the pressure within the clamping spring chamber 17 is increased during the rising up of the first piston 11, the pressurized oil leaked from the actuation chamber 18 into the spring chamber 17 through the sealing O-rings 24, 25 and the air within the spring chamber 17 push and open the checking member 47 and flow out to the outside of the housing 7.

Next, the pressurized oil having a high pressure (a pressure of about 42 $kgf/cm^2$ to 70 $kgf/cm^2$ in this embodiment) is supplied to the supply/discharge port 40. When that high pressurized oil is supplied to the actuation chamber 18, as shown in FIG. 3, the second piston 12 is lowered straight by a distance of the swing stroke S, against the second spring 22. Thereupon, the rod 5 is made to swing following the engagement between the spiral portion 35*b* of the guide groove 35 and the ball 36 with respect to the shaft 34 prevented from being swung by the swing prevention mechanism 32, so that the clamping member 4 can be changed over to the retreated position Z.

When changing over from the retreated condition of FIG. 3 to the clamping condition of FIG. 1 through the unclamping condition of FIG. 2, first the pressure within the actuation chamber 18 is lowered from the high pressure (the pressure of about 42 $kgf/cm^2$ to 70 $kgf/cm^2$) to the middle pressure (the pressure of about 14 $kgf/cm^2$ to 28 $kgf/cm^2$).

Thereupon, as shown in the unclamping condition of FIG. 2, the second piston 12 is raised up by a distance of the swing stroke S (refer to FIG. 3) by the second spring 22. Thereupon, the clamping member 4 is made to swing following the engagement between the spiral portion 35*b* of the guide groove 35 and the ball 36 and changed over to the unclamping position Y of FIG. 2.

Then, the pressurized oil is discharged from the supply/discharge port 40 and an interior of the actuation chamber 18 is changed over to a non-pressure condition. Thus, as shown in FIG. 1, the first spring 21 pushes the clamping member 4 downward through the first piston 11, the thrust bearing 15 and the transmission flange 14 in order, so that the clamping member 4 can be changed over to the clamping position X.

Though the pressure within the clamping spring chamber 17 lowers below the atmospheric pressure during the lowering of the first piston 11, since the checking member 47 is held in closing contact with the check valve seat 45, a liquid such as water and cutting oil, a gas such as air and a solid substance such as dust and dirt existing outside of the housing 7 can't enter the clamping spring chamber 17. Therefore, it is possible to drive the first piston 11 smoothly for a long period of time by preventing the corrosion of the cylinder bore 9.

By the way, since the checking member 47 is held in the closed condition during the lowering stroke of the piston 11, an interior pressure of the first chamber 17 becomes negative and the negative pressure tends to raise the piston 11. But, since the negative pressure is very small in comparison with the urging force of the spring 21, the piston 11 can be strongly lowered by the spring 21. Incidentally, when the urging force of the spring 21 is set to 400 kgf and the pressure receiving area of the piston 11 is 12 $cm^2$, even if the interior of the first chamber 17 becomes vacuum (−1 $kgf/cm^2$), the negative pressure acting on the piston 11 is 12 kgf, which is merely 3% of the urging force of the spring 21. Accordingly, it is possible to lower the piston 11 smoothly.

The above-mentioned first embodiment can be modified as follows.

The swinging operation means 27 may be such a one as to use a fluid pressure motor or as to use an electrically powered actuator such as a solenoid and an electric motor instead of the above-mentioned piston actuating type.

Figure 6:
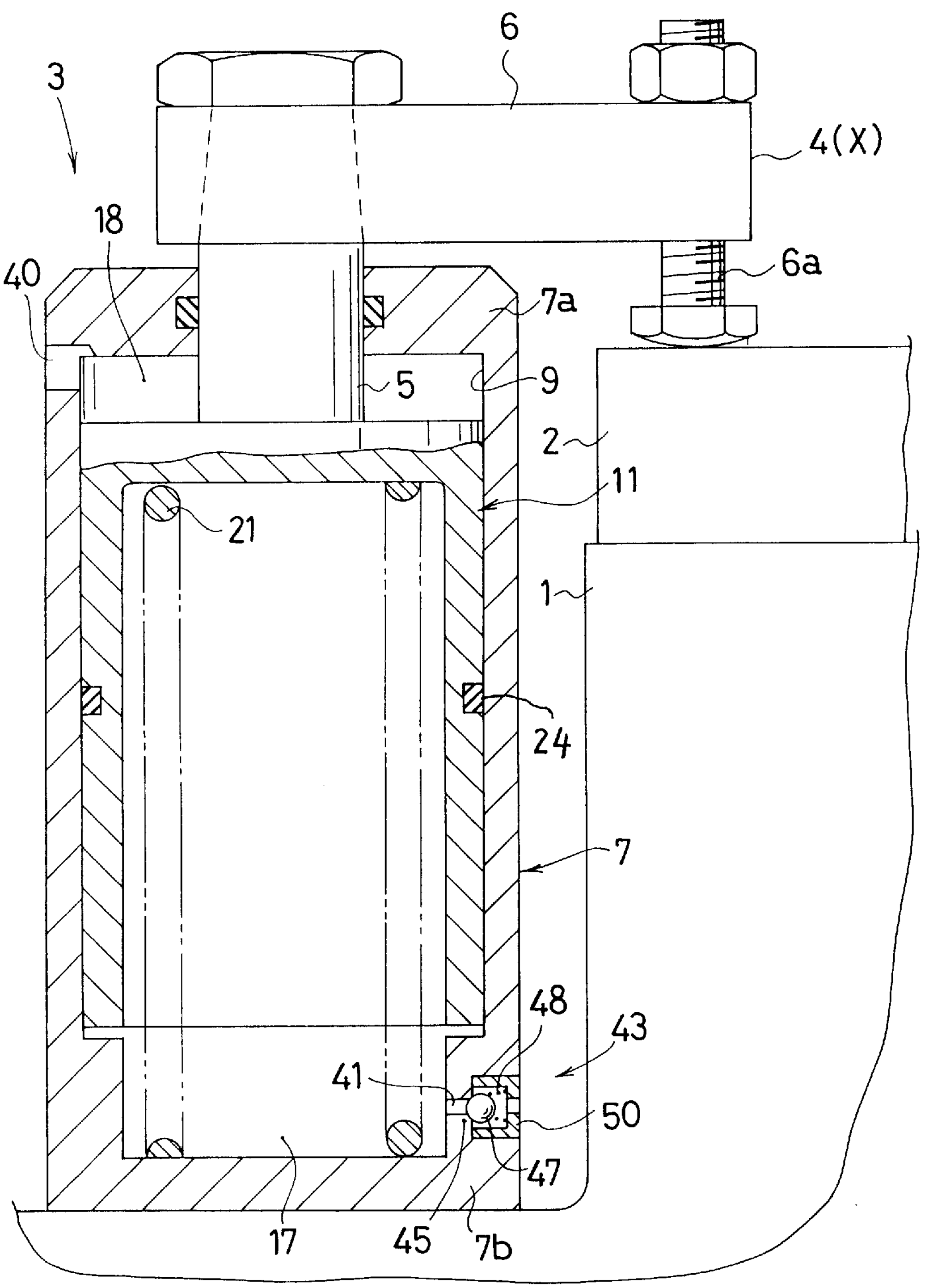
FIG. 6 shows a second embodiment of the present invention and is a view corresponding to FIG. 1.

FIG. 6 shows a second embodiment and is a view corresponding to FIG. 1. A clamping apparatus 3 of FIG. 6 is of the spring-return type, on which it is different from the first embodiment of FIG. 1. Component members having the same functions as those of FIG. 1 will be explained by designating with the same symbols.

The piston 11 is hermetically inserted into the cylinder bore 9 through the O-ring (sealing member) 24, the clamping actuation chamber (second chamber) 18 is formed above the piston 11, and the spring chamber (first chamber) 17 is formed below the piston 11. The return spring 21 is installed within the spring chamber 17. The check valve 43 similar to that of the first embodiment is mounted to the breathing passage 41 of the spring chamber 17.

When the pressurized oil is supplied to the actuation chamber 18 from the pressurized oil supply/discharge port 40, the piston 11 is lowered against the spring 21 and the clamping member 4 fixedly secured to the piston 11 is moved to the clamping position X, so that the push bolt 6*a* pushes the workpiece 2 onto the table 1. Since the inside pressure of the spring chamber 17 is increased by the lowering of the piston 11, the pressurized oil leaked from the actuation chamber 18 into the spring chamber 17 through the sealing O-ring 24 and the air within the spring chamber 17 push and open the checking member 47 to flow to the outside of the housing 7.

To the contrary, when the pressurized oil is discharged from the actuation chamber 18, the piston 11 is raised up by the urging force of the spring 21. In this case, the interior pressure of the spring chamber 17 becomes negative because the checking member 47 is pushed to be closed. But, by setting the urging force of the spring 21 to a stronger value than a negative pressure acting on the piston 11, the clamping member 4 can be actuated smoothly to the upside unclamping position by the piston 11.

Incidentally, in the above-mentioned respective embodiments, the fluid to be supplied to the actuation chamber 18 may be other kinds of liquid or a gas such as air instead of the pressurized oil.

Further, by setting the urging force of the checking spring 48 of the check valve 43 to a value a little higher than those of the above-mentioned respective embodiments, the gas such as the air may be always sealed in the spring chamber (first chamber) 17 at a predetermined pressure (for example, a pressure of about 1 $kgf/cm^2$ to several $kgf/cm^2$). In this case, since the interior pressure of the spring chamber 17 can be prevented from becoming negative, the urging force of the spring 21 is not offset by the negative pressure, so that the piston 11 can be driven strongly and foreign materials within the atmosphere can be reliably prevented from entering the spring chamber 17.

It will be apparent from the foregoing that, while particular forms of the invention have been illustrated and described, various modifications can be made without departing from the spirit and scope of the invention. Accordingly, it is not intended that the invention be limited, except as by the appended claims.

What is claimed is:

1. A cylinder apparatus, comprising:

a piston (11) having a first end side and a second end side, the piston (11) being inserted into a cylindrical bore (9) of a housing (7);

a first chamber (17) defined on the first end side of the piston (11), the first chamber (17) essentially forming a gas space;

a second chamber (18) defined on the second end side of the piston (11), the second chamber (18) having a pressurized fluid supplied thereto and discharged therefrom;

a spring (21) within the first chamber (17) for urging the piston (11) toward the second end side;

a check valve (43) provided within a wall of the housing (7), the check valve (43) including a valve seat (45) and a valve chamber (46);

a breathing passage (41) inside the valve seat (45) which provides communication between the first chamber (17) and the valve chamber (46);

a small passage in a peripheral wall of the valve chamber (46) which provides communication between the valve chamber (46) and the atmosphere outside of the cylinder apparatus; and a valve member (47) within the valve chamber (46), the valve member (47) being resiliently pushed into closing contact with the valve seat (45) by an elastic member (48) disposed in the valve chamber (46);

wherein the peripheral wall of the valve chamber (46) retains the valve member (47) and the elastic member (48) within the wall of the housing (7) such that the valve member (47) and the elastic member (48) are not exposed to an exterior area of the cylinder apparatus.

2. A cylinder apparatus according to claim 1, further comprising:

a clamping member (4) connected to the piston (11), the clamping member (4) being movable to a clamping position (X) by an urging force of the spring (21) within the first chamber (17) acting on the piston (11) and movable to an unclamping position (Y) by an urging force of the pressurized fluid supplied to the second chamber (18) acting on the piston (11).

3. A cylinder apparatus according to claim 1, further comprising:

a clamping member (4) connected to the piston (11), the clamping member (4) being movable to a clamping position (X) by an urging force of the pressurized fluid supplied to the second chamber (18) acting on the piston (11) and movable to an unclamping position (Y) by an urging force of the spring (21) within the first chamber (17) acting on the piston (11).

4. A cylinder apparatus according to claim 1, further comprising:

a sleeve (50) attached to the housing (7) around the valve chamber (46);

wherein the sleeve (50) retains the valve member (47) and the elastic member (48) within the wall of the housing (7) and wherein the elastic member (48) is a checking spring which pushes against the sleeve (50) to resiliently push the valve member (47) into closing contact with the valve seat (45).

5. A cylinder apparatus according to claim 4, wherein a gas having a predetermined pressure is sealed within the first chamber (17) and the valve member (47) is pushed into closing contact with the valve (45) by the checking spring (48) against the pressure of the sealed gas.

* * * * *